(12) United States Patent
Gonsalves

(10) Patent No.: US 6,351,557 B1
(45) Date of Patent: Feb. 26, 2002

(54) METHOD AND APPARATUS FOR COLOR MANIPULATION

(75) Inventor: Robert Gonsalves, Wellesly, MA (US)

(73) Assignee: Avid Technology, Inc., Tewksbury, MA (US)

(*) Notice: Subject to any disclaimer, the term of this patent is extended or adjusted under 35 U.S.C. 154(b) by 0 days.

(21) Appl. No.: 09/054,835

(22) Filed: Apr. 3, 1998

(51) Int. Cl.[7] .................................................. G06K 9/00
(52) U.S. Cl. ...................................................... 382/167
(58) Field of Search ........................... 382/167; 358/518, 358/520

(56) References Cited

U.S. PATENT DOCUMENTS

| | | |
|---|---|---|
| 4,189,742 A | 2/1980 | Klopsch |
| 4,272,780 A | 6/1981 | Belmares-Sarabia et al. |
| 4,298,885 A | 11/1981 | Okada ........................ 358/39 |
| 4,367,465 A | 1/1983 | Mati et al. |
| 4,385,311 A | 5/1983 | Harwood et al. |
| 4,410,908 A | 10/1983 | Belmares-Sarabia et al. |
| 4,418,358 A | 11/1983 | Poetsch et al. |
| 4,488,245 A | 12/1984 | Dalke et al. |
| 4,492,978 A | 1/1985 | Thomas |
| 4,571,632 A | 2/1986 | Schaphorst et al. |
| 4,599,643 A | 7/1986 | Harlan ........................ 358/74 |
| 4,602,286 A | 7/1986 | Kellar et al. |
| 4,642,632 A | 2/1987 | Ohyagi et al. |
| 4,642,676 A | 2/1987 | Weinger |
| 4,679,067 A | 7/1987 | Belmares-Sarabia et al. |
| 4,694,329 A | 9/1987 | Belmares-Sarabia et al. |
| 4,698,666 A | 10/1987 | Lake, Jr. et al. |
| 4,727,412 A | 2/1988 | Fearing et al. |
| 4,733,230 A | 3/1988 | Kurihara et al. |
| 4,750,050 A | 6/1988 | Belmares-Sarabia et al. |
| 4,763,186 A | 8/1988 | Belmares-Sarabia et al. |
| 4,782,397 A | 11/1988 | Kimoto |
| 4,794,460 A | 12/1988 | Shiota |

(List continued on next page.)

FOREIGN PATENT DOCUMENTS

| | | |
|---|---|---|
| EP | 0 205 332 B1 | 10/1990 |
| EP | 0 512 839 A2 | 11/1992 |
| EP | 0 517 035 A2 | 12/1992 |
| EP | 0594312 A1 | 4/1994 |
| EP | 0 494 325 B1 | 11/1995 |
| EP | 0702 832 B1 | 3/1996 |
| EP | 0 709 806 A2 | 5/1996 |
| EP | 0871177 A2 | 10/1998 |
| EP | 0 741 492 B1 | 3/1999 |
| GB | 2 312 120 A | 10/1997 |
| GB | 2 312 348 A | 10/1997 |
| WO | WO 94/29868 | 12/1994 |
| WO | WO 96/13807 | 5/1996 |
| WO | WO 97/06631 | 2/1997 |
| WO | WO 97/39452 | 10/1997 |
| WO | WO 98/11510 | 3/1998 |

OTHER PUBLICATIONS

Alan Wm. Paeth, Distance Approximations and Bounding Polyhedra, copyright © 1995 by Academic Press, Inc., pp. 78–87.

(List continued on next page.)

*Primary Examiner*—Phuoc Tran
(74) *Attorney, Agent, or Firm*—Peter J. Gordon

(57) ABSTRACT

Recoloring an object may be performed by calculating an offset in the hue, saturation and luminance between the source and destination colors. The source image is then adjusted using these offsets to produce the desired color.

12 Claims, 3 Drawing Sheets

U.S. PATENT DOCUMENTS

| | | | |
|---|---|---|---|
| 4,797,733 A | 1/1989 | Takagi et al. | 358/29 |
| 4,811,084 A | 3/1989 | Belmares-Sarabia et al. | |
| 4,823,184 A | 4/1989 | Belmares-Sarabia et al. | |
| 4,827,344 A | 5/1989 | Astle et al. | |
| 4,857,994 A | 8/1989 | Belmares-Sarabia et al. | |
| 4,862,251 A | 8/1989 | Belmares-Sarabia et al. | |
| 4,866,511 A | 9/1989 | Belmares-Sarabia et al. | |
| 4,876,589 A | 10/1989 | Orsburn et al. | |
| 4,907,071 A | 3/1990 | Belmares-Sarabia et al. | |
| 5,038,206 A | 8/1991 | Ubukata | 358/37 |
| 5,070,397 A | 12/1991 | Wedderburn-Bisshop | 358/22 |
| 5,089,882 A | 2/1992 | Kaye et al. | |
| 5,129,013 A | 7/1992 | Holzmann et al. | |
| 5,130,789 A * | 7/1992 | Dobbs et al. | 358/75 |
| 5,134,688 A | 7/1992 | Corthout | |
| 5,140,416 A | 8/1992 | Tinkler | |
| 5,142,273 A | 8/1992 | Wobermin | |
| 5,146,325 A | 9/1992 | Ng | |
| 5,153,937 A | 10/1992 | Wobermin et al. | |
| 5,179,641 A | 1/1993 | Comins et al. | |
| 5,181,113 A | 1/1993 | Chang | |
| 5,218,671 A | 6/1993 | Liao et al. | |
| 5,241,372 A | 8/1993 | Ohba | |
| 5,253,043 A | 10/1993 | Gibson | |
| 5,283,651 A | 2/1994 | Ishizuka | |
| 5,289,295 A * | 2/1994 | Yumiba et al. | 358/518 |
| 5,313,275 A | 5/1994 | Daly et al. | |
| 5,317,678 A | 5/1994 | Okawara et al. | |
| 5,325,449 A | 6/1994 | Burt et al. | |
| 5,373,327 A | 12/1994 | McGee et al. | |
| 5,381,185 A | 1/1995 | Ohki et al. | |
| 5,392,385 A | 2/1995 | Evangelisti et al. | |
| 5,398,123 A | 3/1995 | Katsuma | |
| 5,418,895 A | 5/1995 | Lee | |
| 5,420,971 A | 5/1995 | Westerink et al. | |
| 5,438,651 A | 8/1995 | Suzuki et al. | |
| 5,444,835 A | 8/1995 | Turkowski | |
| 5,450,134 A | 9/1995 | Legate | |
| 5,479,590 A | 12/1995 | Lin | |
| 5,488,429 A | 1/1996 | Kojima et al. | |
| 5,488,674 A | 1/1996 | Burt et al. | |
| 5,506,946 A | 4/1996 | Bar et al. | |
| 5,510,843 A | 4/1996 | Keene et al. | |
| 5,510,851 A | 4/1996 | Foley et al. | |
| 5,532,751 A | 7/1996 | Lui | |
| 5,557,334 A | 9/1996 | Legate | |
| 5,557,339 A | 9/1996 | Dadourian | |
| 5,557,340 A | 9/1996 | Millward | |
| 5,600,376 A | 2/1997 | Casavant et al. | |
| 5,611,030 A | 3/1997 | Stokes | |
| 5,615,324 A | 3/1997 | Kuboyama | |
| 5,625,421 A | 4/1997 | Faroudja et al. | |
| 5,630,037 A | 5/1997 | Schindler | |
| 5,633,687 A | 5/1997 | Bhayani et al. | |
| 5,636,290 A | 6/1997 | Kita et al. | |
| 5,638,136 A | 6/1997 | Kojima et al. | |
| 5,638,138 A | 6/1997 | Hickman | 348/678 |
| 5,645,884 A | 7/1997 | Harlow, Jr. et al. | |
| 5,657,094 A | 8/1997 | Moriwake | 348/578 |
| 5,659,639 A | 8/1997 | Mahoney et al. | |
| 5,661,525 A | 8/1997 | Kovacevicet et al. | |
| 5,663,765 A | 9/1997 | Matsuse et al. | |
| 5,682,443 A | 10/1997 | Gouch et al. | |
| 5,703,654 A | 12/1997 | Iizuka | |
| 5,703,659 A | 12/1997 | Tanaka | |
| 5,715,377 A | 2/1998 | Fukushima et al. | 395/109 |
| 5,729,360 A | 3/1998 | Kita et al. | 358/500 |
| 5,745,121 A | 4/1998 | Politis | |
| 5,754,180 A | 5/1998 | Kivolowitz et al. | |
| 5,770,299 A | 6/1998 | Dannenhauer et al. | |
| 5,774,112 A | 6/1998 | Kasson | 345/153 |
| 5,805,169 A | 9/1998 | Harada et al. | |
| 5,888,444 A | 3/1999 | Dannenhauer et al. | |

OTHER PUBLICATIONS

James D. Foley and Andries Van Dam, Fundamentals of Interactive Computer Graphics copyright © 1982 by Addison–Wesley Publishing Company, Inc., pp. 245–249.

Eric N. Mortensen and William A. Barrett, Intelligent Scissors for Image Composition Computer Graphics Proceedings, Annual Conference Series 1995, Siggraph 95 Conference Proceedings Aug. 6–11, 1995. A publication of ACM SIGGRAPH, pp. 191–198.

Alvy Ray Smith and James F. Blinn, Blue Screen Matting, Computer Graphics Proceedings, Annual Conference Series, 1996, SIGGRAPH 96, New Orleans, Louisiana, Aug. 4–9, 1996, pp. 259–268.

* cited by examiner

METHOD AND APPARATUS FOR COLOR MANIPULATION

FIELD OF THE INVENTION

The present invention is related to methods and apparatus of recoloring an object in an image.

BACKGROUND

A common manipulation of images including both still images and in motion video, is to recolor an object. The process of recoloring an object in an image generally involves selecting a portion of an image to be recolored, and then applying adjustments to the selected portion, either manually or by some function. A significant difficulty in recoloring an object is ensuring that the resultant coloration looks natural.

As used herein, a "color space" is a multidimensional mathematical coordinate system within which colors are defined. A "color" is a single point within a color space. Usually, a color space has three dimensions and a color is therefore defined by a triplet of values. However, color spaces, and hence color representations, sometimes have higher order dimensionality. Moreover, the dimensions of a color space can be non-linear and can be expressed in various units, including angles, magnitudes, etc.

Some popular color spaces are known as "HSL", "RGB", "CMYK" and "$YC_RC_B$". The names of these color spaces make direct reference to the dimensions in which colors are represented. For example, HSL color space has dimensions of hue (H), luminance (L) and saturation (S); while $YC_RC_B$ color space has dimensions of luminance (Y) and two dimensions of chrominance ($C_R$ and $C_B$). The most common color space in which computers represent source images, RGB, has dimensions of red(R), green(G) and blue(B).

Producers of still pictures and motion video programs use a variety of special effects to produce a final product. A graphics editor performs the task of adding special effects to still pictures and to motion video segments using a graphics workstation.

Recoloring is a special effect that involves changing the color of certain pixels within one or more video image frames. One application of recoloring involves modifying the color of an object to make it more or less noticeable in the video image frame. Another application of recoloring is to repair a damaged portion of the video image frame. A third application of recoloring is to add color to a video image frame to generate the appearance of one or more new objects in the video image frame.

Using one technique to achieve a recolor effect, the graphics editor, using a mouse, graphics tablet or similar input device, manually, or with the aid of object tracing software, circumscribes an area of a video image frame that is to receive the recolor effect using the graphics workstation. Then, the graphics editor changes the color of each pixel within the circumscribed area to a specified destination color. The tracing work, whether manual or aided by software, is painstaking and tedious to do accurately.

Since every pixel within the circumscribed area is changed to the new destination color, the graphics editor must circumscribe the intended recolor area with precision. If the graphics editor does a poor job of circumscribing the area, some pixels that were not intended to be changed may be changed, and some pixels intended to be changed may be left unchanged.

Producing recolor effects using this first conventional technique has some drawbacks. In particular, setting each pixel of an object to be a destination color generally makes the object look flat and two-dimensional rather than three-dimensional which is often preferred. Additionally, it is not practical for a graphics editor to perform this process on motion video footage that may include a sequence of hundreds or even thousands of individual frames. Furthermore, conventional color correction algorithms performed on computers are complex and require substantial computer power.

In a related, conventional technique, each pixel in the region circumscribed by the graphics editor is first converted to HSL color space. The technique then replaces the hue value of each selected pixel with a new value equal to the hue of the destination color. Each pixel is then converted back to the color space in which the pixel was originally represented.

This second technique also gives an unnatural appearing result. The recolored portion of the image does not retain the variations in hue or luminance originally present.

In yet another conventional technique, each pixel in the region circumscribed is first converted to $YC_RC_B$ color space. The values of $C_R$ and $C_B$ of each selected pixel are replaced with new values corresponding to those of the destination color. Again, each pixel is then converted back to the color space in which the pixel was originally represented.

This third conventional technique also produces an unnatural result. In this technique, replacing a light color with a dark color, or vice versa, exacerbates the unnatural result. For example, if the color being replaced is light, say yellow, and the color being inserted is dark, say red, the result is likely to be an unexpected and undesired pink.

None of the conventional techniques discussed above produces a natural recoloring result which retains all of the subtlety and character of an original object in a recolored object.

SUMMARY

Recoloring an object may be performed by calculating an offset in the hue, saturation and luminance between the source and destination colors. The source image is then adjusted using these offsets to produce the desired color.

Accordingly, in one aspect, a method for adjusting the color of a portion of an image involves receiving an indication of a source color and a target color. A difference between the source color and target color are computed to identify offsets in the values of the color components. Pixels identified in the image as matching the source color are adjusted using these offsets to produce a color adjusted image.

In another aspect, an apparatus for manipulating color of a portion of an image includes a difference calculator for determining offsets in the components of the source color and a target color. A color adjustment module receives indications of the pixels to be modified and modifies the pixels of the selected portion of the image according to the determined offsets to provide a color adjusted image.

In accordance with yet other aspects of the invention, there are recolored images and entertainment products incorporating such recolored images. The recolored images and entertainment products of these aspects involve a method including receiving an indication of a source color and a target color. A difference between the source color and target color are computed to identify offsets in the values of the color components. Pixels identified in the image as matching the source color are adjusted using these offsets to produce a color adjusted image.

DETAILED DESCRIPTION

The present invention will be more completely understood through the following detailed description which should be read in conjunction with the attached drawing in which similar reference numbers indicate similar structures. All references cited herein are hereby expressly incorporated by reference.

Figure 1:
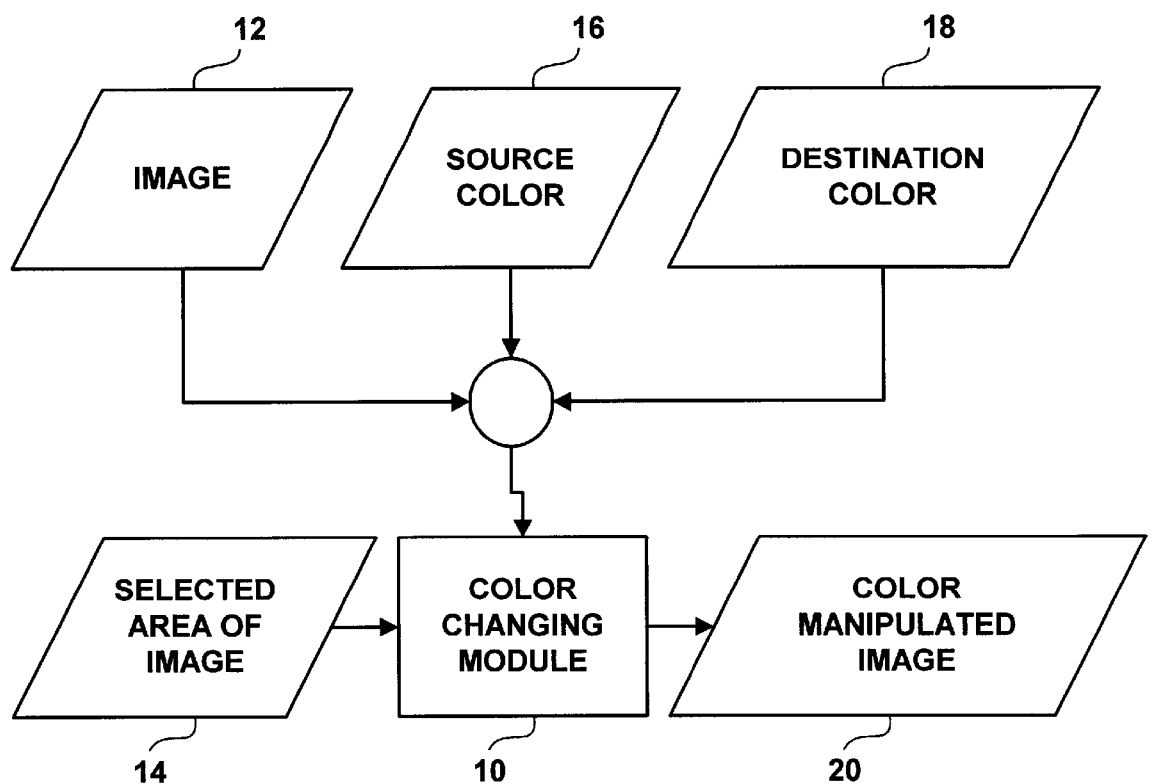
FIG. 1 is a block diagram showing the general structure of a color manipulation system in one embodiment.
Figure 2:
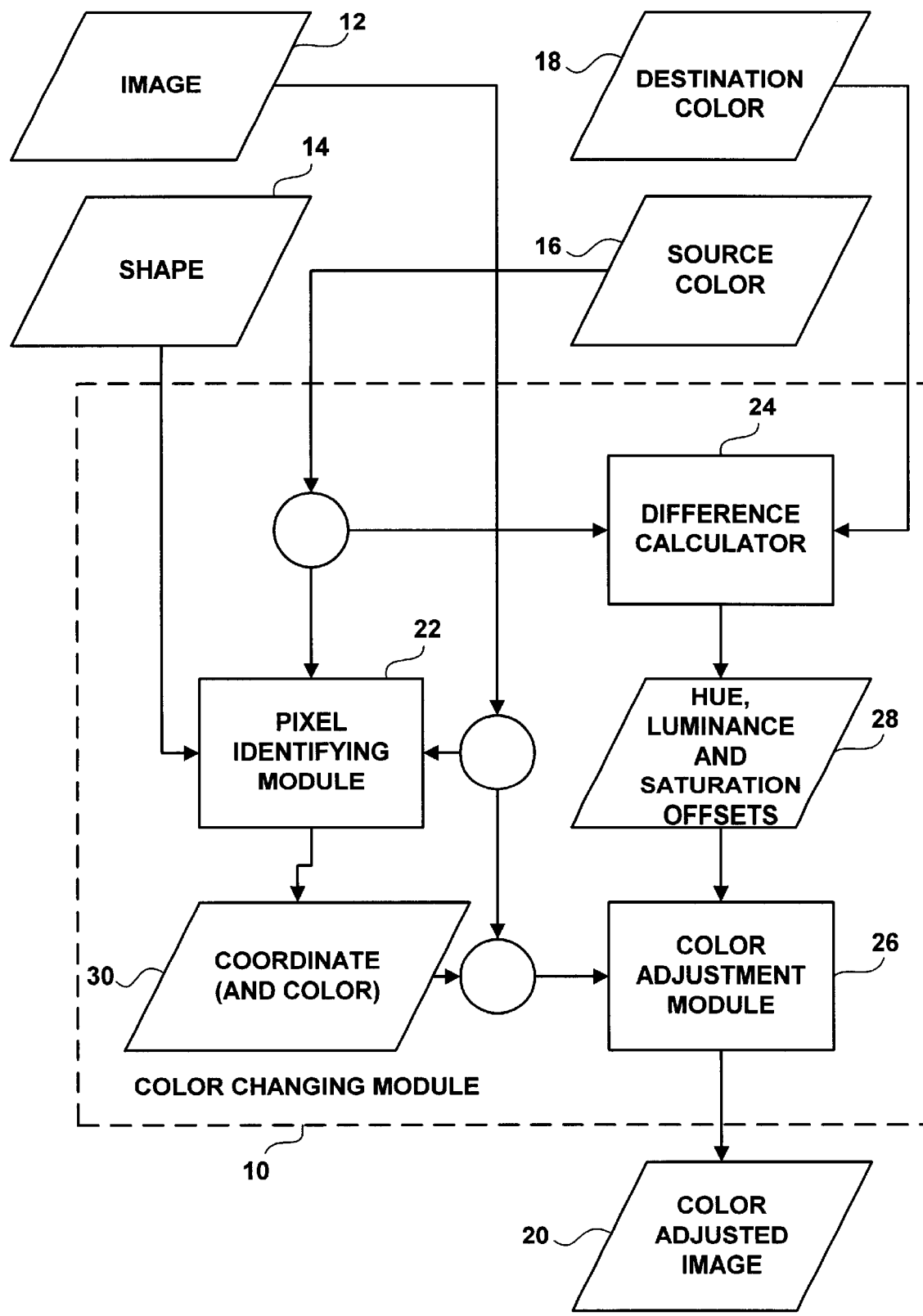
FIG. 2 is a more detailed block diagram of the system of FIG. 1.

A computer system for implementing the system of FIGS. 1 and 2 as a computer program typically includes a main unit connected to both an output device which displays information to a user and an input device which receives input from a user. The main unit generally includes a processor connected to a memory system via an interconnection mechanism. The input device and output device also are connected to the processor and memory system via the interconnection mechanism.

It should be understood that one or more output devices may be connected to the computer system. Example output devices include a cathode ray tube (CRT) display, liquid crystal displays (LCD), printers, communication devices such as a modem, and audio output. It should also be understood that one or more input devices may be connected to the computer system. Example input devices include a keyboard, keypad, track ball, mouse, pen and tablet, communication device, and data input devices such as sensors. It should be understood the invention is not limited to the particular input or output devices used in combination with the computer system or to those described herein.

The computer system may be a general purpose computer system which is programmable using a computer programming language, such as "C++," JAVA or other language, such as a scripting language or even assembly language. The computer system may also be specially programmed, special purpose hardware. In a general purpose computer system, the processor is typically a commercially available processor, of which the series x86 and Pentium processors, available from Intel, and similar devices from AMD and Cyrix, the 680X0 series microprocessors available from Motorola, the PowerPC microprocessor from IBM and the Alpha-series processors from Digital Equipment Corporation, are examples. Many other processors are available. Such a microprocessor executes a program called an operating system, of which WindowsNT, UNIX, DOS, VMS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

It should be understood the invention is not limited to a particular computer platform, particular processor, or particular high-level programming language. Additionally, the computer system may be a multiprocessor computer system or may include multiple computers connected over a computer network. It should be understood that each module 22, 24 and 26 may be separate modules of a computer program, or may be separate computer programs. Such modules may be operable on separate computers.

Referring now to FIG. 1, a color changing module 10 may be embodied in a computer program or special purpose hardware to manipulate an input image 12 by changing one or more colors in the image 12. Application of the process performed by the color changing module 10 may be limited to a selected area 14 of the source image 12. Thus, the pixels operated upon by the color changing module 10 are bounded both in physical space, i.e., by their position in the input image, and in color space, i.e., by the position of their color values in color space. The selected area 14 of the source image 12 may be defined using several known techniques, including those such as shown in U.S. patent application Ser. No. 08/832,862 and U.S. patent application Ser. No. 08/821,336 and as shown in Mortensen et al., "Intelligent Scissors for Image Composition", Computer Graphics Proceedings, Annual Conference Series, 1995, pp. 191–198.

The color changing module 10 also receives as inputs an indication of a source color 16 and an indication of a target color 18. The indication of the source color and the indication of the target color should be made in, or connected to, the same color space, e.g., HSL space, using values defined with the same precision. As discussed above, the dimensions of HSL color space are hue, saturation, and luminance. Other suitable color spaces and their dimensions include RGB: red, green and blue; CMYK: cyan, magenta, yellow and black; and $YC_RC_B$: luminance and chrorninance. If the color space or precision of all the inputs to the color changing module 10 are not the same, they should first be converted to a convenient color space and least common precision, using known techniques. The color changing module 10 determines the offset between the source color 16 and target color 18. Pixels in the selected area of the input image 12 whose position in the color space is sufficiently close to that of the source color 16 are considered to match the source color 16 and are adjusted according to the difference between the source and target colors. A "source color cloud" is defined as all those points in the color space which are sufficiently close to the source color to be considered a match for the source color. Techniques for obtaining a source color cloud from a source color are shown in U.S. patent application Ser. No. 08/832,862. In the illustrated embodiment, the match is determined by separately measuring the distance in each dimension of the color space from the pixel color to the source color 16. The color changing module 10 then produces a color manipulated image, as indicated at 20.

The system of FIG. 1, as discussed above, may be implemented as a computer program to be used as part of or in conjunction with other image painting programs, video special effects equipment, and non-linear video editors.

Referring now to FIG. 2, the system of FIG. 1 will be described in more detail.

The color matching module 10 includes a difference calculator 24 which determines the difference in values of the components defining the source color 16 and target color 18. Where the source and target colors are represented in HSL space, using hue, saturation and luminance values, as in this exemplary embodiment, the difference calculator 24 outputs hue, saturation and luminance offset values 28. The difference calculator 24 of embodiments receiving inputs represented in other color representation spaces should be made to match the input color representation space. It should be recognized by the skilled artisan that following references herein to HSL space and its dimensions are given by way of example only, as the described techniques can be altered to use any suitable color space in which a particular embodiment is made to operate. A pixel identifying module 22 determines pixels in the input image 12 and within the selected area 14 of the input image which match the source color 16, i.e., whose color is within the source color cloud. Closeness of the match producing the source color cloud is determined by thresholds set by the skilled artisan or operator to obtain a desired result. The output of the pixel identifying module provides the coordinates within the image, and possibly the color, of the identified pixels as indicated at 30. The operation of the color difference calculator 24 will be described in more detail below.

A color adjustment module 26 receives the hue, saturation and luminance offsets 28, the specified coordinates 30 and the input image 12. The color adjustment module 26 adjusts the specified pixels in the image 12 to produce the color adjusted image 20. In particular, the offsets in hue and offsets in luminance are used to compute adjustment terms which are then used to translate the hue and luminance color space values of the specified pixels to new hue and luminance color space values. Saturation of the specified pixels is changed according to a method which depends on the direction in which the saturation is to be adjusted. For example, if a highly saturated color needs to be unsaturated, the saturation value is scaled down using a multiplicative scale factor. If a less saturated color is to become more saturated, the saturation values are translated up using an additive term. This apparently discontinuous handling of saturation avoids generating invalid saturation values when scaling down, while producing natural results when scaling up. Moreover, for small changes in saturation, the above described adjustment in either direction becomes similar, producing a continuous function. The adjustment of hue, saturation and luminance color space values is described in more detail, below.

The operation of the system of FIG. 2 will now be described in connection with a flow chart shown in FIG. 3. The color changing module 10 receives in step 40 the source color and target color. In step 42, the hue, saturation and luminance offsets are computed. The input image to be modified and the selected portion of the image are received in step 44. The order of steps 40 through 44 is immaterial. After the source color and input image are received, the source color is matched to colors of the pixels in the received input image to identify those pixels to be modified. This matching step may be limited by a specified shape or selected portion of the input image. Given the computed hue, saturation and luminance offsets from step 42, the pixels identified in step 46 are adjusted in step 48. Step 46 of matching is performed as described in U.S. patent application Ser. No. 08/832,862, mentioned above. The step 48 of adjusting the hue, saturation and luminance of identified pixels will be described in more detail, below.

Many systems in common use, particularly computer-based systems represent colors in RGB space. However, some computations used in this exemplary embodiment of the invention are more simply expressed in HSL space, while YUV space serves as a useful intermediary. In the following discussion, it is assumed that input colors are represented in RGB space.

First, the color difference calculator (FIGS. 2, 24) computes the offsets (FIGS. 2, 28) as follows. (See also FIG. 3, step 42) The components of the source color 16 are expressed as sRed, sGreen and Blue in RGB space. Also in RGB space, the components of the target color 18 are expressed as tRed, tGreen and tBlue. The adjustment terms to be calculated are lumAdjust, uAdjust, vAdjust, cm0, cm1, cm2 and cm3.

First, the source color 16 is converted to YUV space by a conventional RGB to YUV transform.

$$sY, sU, sV=rgb\_to\_uv(sRed, sGreen, sBlue). \quad (1)$$

Then the target color 18 is also converted to YUV space by the same conventional transform:

$$tY, tU, tV=rgb\_to\_yuv(tRed, tGreen, tBlue). \quad (2)$$

The hue and saturation of the source color 16 is then computed from sU and sV. If either sU or sV is non-zero, then:

$$sHue=atan2(sU, sV)$$

$$sSat=sqrt(sU*sU+sV*sV), \quad (3)$$

otherwise, if both sU and sV are zero, then:

$$sHue=0.0$$

$$sSat=epsilon, \quad (4)$$

where epsilon is a small number used simply to prevent "divide-by-zero" errors. Next, the hue and saturation of the target color 18 is computed from tU and tV. If either tU or tV is n-zero, then:

$$tHue=atan2(tU, tV)$$

$$tSat=sqrt(tU*tU+tV*tV), \quad (5)$$

otherwise, if both tU and tV are zero, then:

$$tHue=0.0$$

$$tSat=epsilon. \quad (6)$$

The hue and luminance offsets are simple differences.

$$hueAdjust=tHue-sHue$$

$$lumAdjust=tY-sY \quad (7)$$

The saturation offset is computed and applied differently depending on whether saturation is to be increased or decreased. If sSat>tSat, then a multiplicative scale factor is computed to scale the saturation down.

satAdjust=tSat/sSat uAdjust=0 vAdjust=0  (8)

Otherwise, an additive translation term is computed to move the saturation up.

satAdjust=1.0 uAdjust=sin(tHue)*(tSat−sSat)

vAdjust=cos(tHue)*(tSat−sSat)  (9)

The hue scalars are simple trigonometric functions of the hue offset.

cos Theta=cos(hueAdjust)

sin Theta=sin(hueAdjust)  (10)

They are then adjusted for saturation.

cos Theta=cos Theta*satAdjust sin Theta=sin Theta*satAdjust  (11)

Finally, the color matrix values are assigned, as follows:

cm0=cos Theta cm1=sin Theta cm2=sin Theta cm3=cos Theta  (12)

Figure 3:
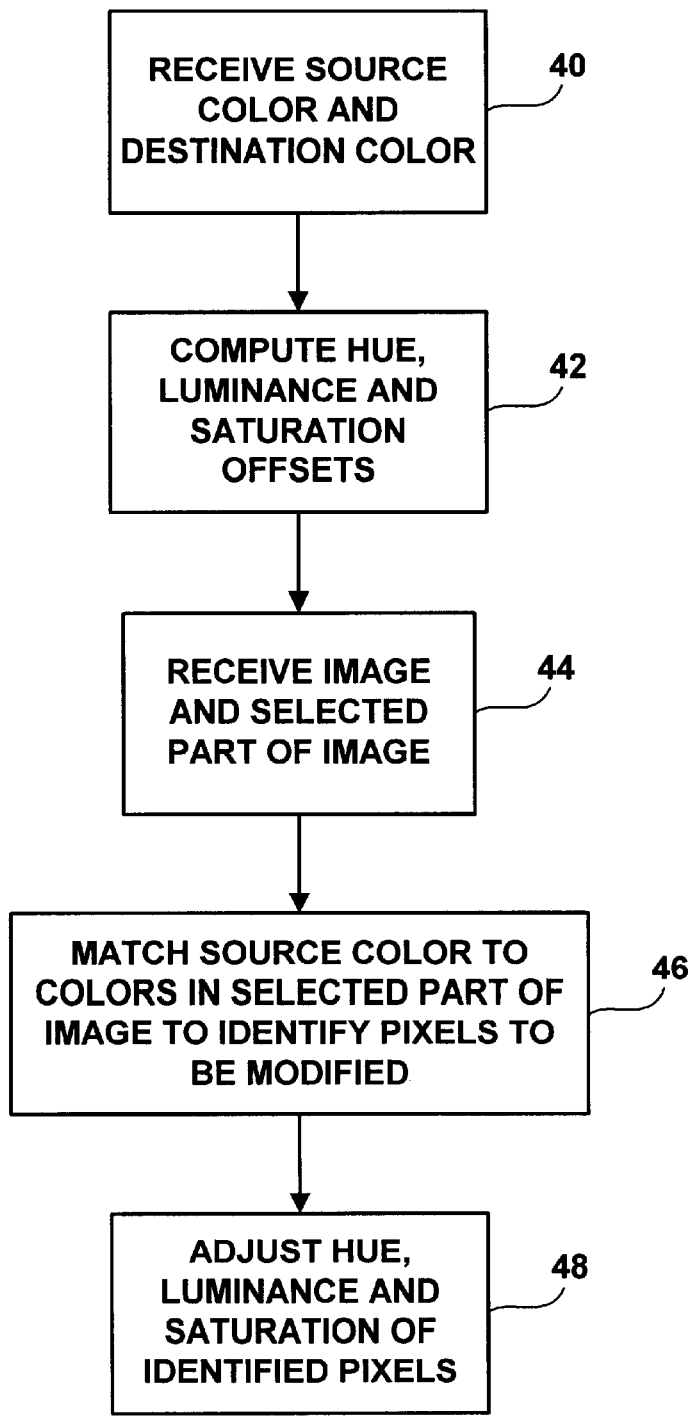
FIG. 3 is a flow chart describing the operation of the system of FIG. 2.

The input image 12 is then processed, adjusting the pixels within a predetermined source cloud (See FIG. 3, step 48). For every selected pixel in the input image within the source cloud, convert the pixel from RGB space to YUV space, modify the color coordinate values, convert the color representation back to RGB and assign it to a corresponding pixel in output image (FIG. 2, 20).

The components of the input pixel color are inRed, inGreen and inBlue. The adjustment terms, previously computed as described above, are lumAdjust, uAdjust, vAdjust, cm0, cm1, cm2 and cm3. The components of the output pixel are outRed, outGreen and outBlue.

The RGB representation of the color of the input pixel is first converted to YUV space, conventionally, as described above.

inY, inU, inV=rgb_to_yuv(inRed, inGreen, inBlue)  (13)

The YUV values of the input pixel are then modified.

outY=inY+lumAdjust outU=cm0*inU+cm1*inV+uAdjust outV=cm2*inU+cm3*inV+vAdjust  (14)

The modification of Equations (14) can produce values outside a valid range for Y, U or V.

Therefore, output values are appropriately limited.

outY=ccir_limit(outY)

outU=ccir_limit(outU)  (15)

outV=ccir_limit(outV)

Finally, the color representation of the output pixel is converted back to RGB, conventionally, in preparation for storing it in the color adjusted image 20.

outRed, outGreen, outBlue=yuv_to_rgb(outY, outU, outV)  (16)

By performing the manipulation on color of a group of pixels whose color lies within a source color cloud based on the offsets between the source and destination colors, a more natural appearance may be obtained in the resulting recolored image than achievable using conventional techniques. As has been discovered by this inventor, conventional techniques, such as mentioned in the BACKGROUND, effectively collapse a source color cloud having three dimensions, i.e., the group of input pixels, into an output color defined in only zero, one or two dimensions. This results in the characteristically flat or unnatural appearance of the output of conventional recoloring systems. In contrast, techniques embodying the present invention scale and/or translate the entire source cloud into a corresponding three-dimensional destination cloud whose constituent color value points are related in a natural way to corresponding points in the source cloud.

This technique is applicable in other color spaces by converting color representations into YUV and HSL, as described above, or by redefining the above-described transformations in another color space. Once having applied the above described technique to an image or sequence of images, the image or images are readily incorporated into entertainment products in which images, sequences of images and full motion video are common. For example, images recolored as described above may be incorporated using conventional technology into commercial movies, commercial videos, computerized multimedia products, computer games, and the like.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A method for adjusting color of a portion of an input image, including:
   receiving an indication of a source color defined by a first set of values and an indication of a destination color defined by a second set of values;
   computing the difference between the source color and destination color by determining offsets between the first set of values and the second set of values;
   identifying pixels in the portion of the input image as similar to the source color, wherein a color of each identified pixel is defined by a third set of values; and
   for each identified pixel, adjusting the third set of values defining the color of the identified pixel using the computed offsets to produce an adjusted set of values that approximates the destination color, including:
   adjusting saturation of the identified pixel according to a method that depends on a direction in which the saturation is to be adjusted.

2. The method of claim 1, wherein adjusting the saturation comprises using a first method if the offset represents an increase in saturation and using a second method if the offset represents a decrease in saturation.

3. The method of claim 2, the step of adjusting further comprising:

for each identified pixel, adding an adjustment value to a saturation value of the identified pixel if the source color is less saturated than the destination color.

4. The method of claim 2, the step of adjusting further comprising:

for each identified pixel, multiplying a saturation value of the identified pixel by an adjustment value if the source color is more saturated than the destination color.

5. An apparatus for manipulating color of a portion of an image, including:

a difference calculator to receive, at one or more inputs, an indication of a source color and an indication of a destination color, to determine offsets between the components of the source color and the components of a destination color and to provide the determined offsets at one or more outputs; and a color adjustment module to receive, at one or more inputs, the offsets and indications of the pixels of the portion of the image to be modified, to modify each recieved pixel according to the determined offsets to produce, for each received pixel, modified components of the received pixel, the modification including adjusting a saturation of the received pixel according to a method that depends on a direction in which the saturation is to be adjusted, and to provide the modified pixels at one or more outputs.

6. The apparatus of claim 5, wherein the color adjustment module adjusts the saturation of each received pixel using a first method if the offset represents an increase in saturation and using a second method if the offset represents a decrease in saturation.

7. The apparatus of claim 6, wherein, for each received pixel, the color adjustment module adds an adjustment value to a saturation value of the received pixel if the source color is less saturated than the destination color.

8. The apparatus of claim 6, wherein, for each received pixel, the color adjustment module multiplies a saturation value of the received pixel by an adjustment value if the source color is more saturated than the destination color.

9. A system for adjusting color of a portion of an input image, the system comprising:

means for receiving an indication of a source color defined by a first set of values and an indication of a destination color defined by a second set of values;

means for computing the difference between the source color and destination color by determining offsets between the first set of values and the second set of values;

means for identifying pixels in the portion of the input image as similar to the source color, wherein a color of each identified pixel is defined by a third set of values; and means for adjusting, for each identified pixel, the third set of values defining the color of the identified pixel using the computed offsets to produce an adjusted set of values that approximates the destination color, including:

means for adjusting saturation of the identified pixel according to a system that depends on a direction in which the saturation is to be adjusted.

10. The system of claim 9, wherein the means for adjusting saturation comprises means for using a first method the offset represents an increase in saturation and means for using a second method if the offset represents a decrease in saturation.

11. The system of claim 10, the means for adjusting saturation further comprising:

means for adding, for each identified pixel, an adjustment value to a saturation value of the identified pixel if the source color is less saturated than the destination color.

12. The system of claim 10, the means for adjusting saturation further comprising:

means for multiplying, for each identified pixel, a saturation value of the identified pixel by an adjustment value if the source color is more saturated than the destination color.

* * * * *